(12) United States Patent
Kaabouch et al.

(10) Patent No.: US 7,613,907 B2
(45) Date of Patent: Nov. 3, 2009

(54) EMBEDDED SOFTWARE CAMOUFLAGE AGAINST CODE REVERSE ENGINEERING

(75) Inventors: Majid Kaabouch, Rousset (FR); Eric Le Cocquen, Saint Maximin la Sainte Beaume (FR)

(73) Assignee: ATMEL Corporation, San Jose, CA (US)

( * ) Notice: Subject to any disclaimer, the term of this patent is extended or adjusted under 35 U.S.C. 154(b) by 357 days.

(21) Appl. No.: 11/558,357

(22) Filed: Nov. 9, 2006

(65) Prior Publication Data

US 2008/0040593 A1 Feb. 14, 2008

Related U.S. Application Data

(60) Provisional application No. 60/822,220, filed on Aug. 11, 2006.

(51) Int. Cl.
*G06F 7/38* (2006.01)
*G06F 9/00* (2006.01)
*G06F 9/44* (2006.01)

(52) U.S. Cl. .................. 712/220; 712/233; 712/236; 712/243; 712/245; 711/203

(58) Field of Classification Search .................. 712/233, 712/245, 243; 711/203
See application file for complete search history.

(56) References Cited

U.S. PATENT DOCUMENTS

| | | | | |
|---|---|---|---|---|
| 3,570,006 | A * | 3/1971 | Hoff et al. .................. | 712/236 |
| 4,447,895 | A | 5/1984 | Asano et al. | |
| 5,404,402 | A | 4/1995 | Sprunk | |
| 5,991,519 | A | 11/1999 | Benhammou et al. | |
| 6,032,248 | A | 2/2000 | Curry et al. | |
| 6,061,449 | A | 5/2000 | Candelore et al. | |
| 6,094,724 | A | 7/2000 | Benhammou et al. | |
| 6,144,230 | A | 11/2000 | Kim | |
| 6,278,783 | B1 | 8/2001 | Kocher et al. | |
| 6,295,606 | B1 | 9/2001 | Messerges et al. | |

(Continued)

FOREIGN PATENT DOCUMENTS

CA 2333095 5/2005

(Continued)

OTHER PUBLICATIONS

Atmel Security Applications "Limiting Illegal Hardware Copies by Using Secure Hardware Authentication" http://www.atmel.com/dyn/products/other-docs.asp?family_id=662, Updated Feb. 2005, pp. 24-26.

(Continued)

*Primary Examiner*—Niketa I Patel
*Assistant Examiner*—Jesse R Moll
(74) *Attorney, Agent, or Firm*—Fish & Richardson P.C.

(57) ABSTRACT

Methods and apparatus for identifying a first flow control instruction in an executing program, the first instruction being associated with a first program address at which program execution will continue after execution of the first instruction. A determination is made as to whether the first program address is protected. If the first program address is protected, a first alternate program address is substituted for the first program address such that program execution will continue at the first alternate program address after execution of the first instruction.

19 Claims, 4 Drawing Sheets

U.S. PATENT DOCUMENTS

| | | | |
|---|---|---|---|
| 6,298,442 | B1 | 10/2001 | Kocher et al. |
| 6,304,658 | B1 | 10/2001 | Kocher et al. |
| 6,327,661 | B1 | 12/2001 | Kocher et al. |
| 6,331,784 | B1 | 12/2001 | Mason et al. |
| 6,381,699 | B2 | 4/2002 | Kocher et al. |
| 6,404,217 | B1 | 6/2002 | Gordon |
| 6,493,260 | B2 | 12/2002 | Micheloni et al. |
| 6,510,518 | B1 | 1/2003 | Jaffe et al. |
| 6,539,092 | B1 | 3/2003 | Kocher |
| 6,654,884 | B2 | 11/2003 | Jaffe et al. |
| 6,695,214 | B1 | 2/2004 | Leydier et al. |
| 6,748,410 | B1 | 6/2004 | Gressel et al. |
| 6,873,706 | B1 | 3/2005 | Miyazaki et al. |
| 6,877,100 | B1 | 4/2005 | Nobunaga et al. |
| 2002/0124178 | A1 | 9/2002 | Kocher et al. |
| 2002/0128794 | A1* | 9/2002 | Miyazaki et al. ............ 702/117 |
| 2003/0044003 | A1 | 3/2003 | Chari et al. |
| 2003/0091191 | A1 | 5/2003 | Watanabe et al. |
| 2003/0120938 | A1 | 6/2003 | Mullor |
| 2004/0162993 | A1 | 8/2004 | Teglia |
| 2005/0069138 | A1 | 3/2005 | De Jong |
| 2005/0144417 | A1* | 6/2005 | Sheriff et al. ............... 711/203 |
| 2005/0271202 | A1 | 12/2005 | Shu et al. |
| 2005/0273630 | A1 | 12/2005 | Shu et al. |
| 2005/0273631 | A1 | 12/2005 | Shu et al. |
| 2006/0045264 | A1 | 3/2006 | Kocher et al. |

FOREIGN PATENT DOCUMENTS

| | | |
|---|---|---|
| EP | 1674966 | 6/2006 |
| WO | WO99/01815 | 1/1999 |
| WO | WO 01/55821 | 8/2001 |
| WO | WO2004/112306 A2 | 12/2004 |

OTHER PUBLICATIONS

Atmel Secure Products, www.atmel.com/dyn/resources/prod-documents/doc.6523.pdf, 2005, 20 pages.

Atmel "Security with Atmel—Hard to Crack" www.atmel.com/dyn/resources/prod-documsnts/doc1596.pdf, Sep. 2005, 2 pages.

Atmel "AT91SC Family High Performance Seure Cryptocontrollers" www.atmel.com/dyn/resources/prod-documents/doc 1593.pdf, Sep. 2005, 2 pages.

Atmel "Secure Microcontrollers for Smart Cards AT90SC9616RC" Rev. Jan. 2003, 4 pages.

Atmel "Development Support AT90SC and AT91SC Families" www.atmel.com/dyn/resources/prod-documents/doc1599.pdf, Sep. 2005, 2 pages.

NAGRAVISION "Technology Series—White Paper STB Security" www.nagravision.com/pdf/NV_TechServices_STBsecurity.pdf, 2005, 8 pages.

Kocher et al., "Differential Power Analysis," (http://www.cryptography.com/resources/whitepapaers/DPA.pdf),Technical Report, 1998, later published in Advances in Cryptology—*Crypto 99 Proceedings, Lecture Notes in Computer Science*, vol. 1666, M Wiener, ed., Springer-Verlag, 1999, 10 pages.

Li, Huiyun, "Security evaluation at design time for cryptographic hardware," Technical Report No. 665, University of Cambridge Computer Laboratory, Document UCAM-CL-TR-665/ISSN 1476-2986, Apr. 2006.

Schuster, Andreas, "Differential Power Analysis of an AES Implementation," Technical Report IAIK-TR Jun. 25, 2004, 12 pages.

Tual, Jean-Pierre, "New Challenges in Smart Card Design," Axalto presentation, MPSOC '05, Jul. 13, 2005.

USENIX Technical Program—Paper—Smartcard 99 , Oliver Kömmerling, "Design Principles for Tamper-Resistant Smartcard Processors", http://www.usenix.org/publications/library/proceedings/smartcard99/full_papers/kommerling/kommerling_html/index.html May 1999, 21 pages.

International Preliminary Examining Authority—PCT/US2007/075446, mailed Aug. 11, 2008, 5pages.

International Search Report & Written Opinion PCT/US2007/078621, mailed Mar. 27, 2008, 11 pages.

International Search Report & Written Opinion PCT/US2007/075446, mailed Jan. 10, 2008, 12pages.

International Search Report & Written Opinion PCT/US2007/075646, mailed Jan. 1, 2008, 12 pages.

* cited by examiner

EMBEDDED SOFTWARE CAMOUFLAGE AGAINST CODE REVERSE ENGINEERING

CROSS-REFERENCE TO RELATED APPLICATIONS

This application claims priority to U.S. Patent Application No. 60/822,220, entitled EMBEDDED SOFTWARE CAMOUFLAGE AGAINST CODE REVERSE ENGINEERING, to Kaabouch, et al., which was filed on Aug. 11, 2006. The disclosure of the above application is incorporated herein by reference in its entirety.

BACKGROUND

The present disclosure relates to protection schemes to prevent reverse engineering of program code stored in electrical circuits.

Secure integrated circuit cards, commonly referred to as smart cards, can be of the form of an embedded integrated circuit hardware device that is small enough to fit into a user's pocket. Secure integrated circuit cards can be used in many situations where critical information must be stored and shared. For example, television set-top boxes that facilitate pay-per-view or video-on-demand features can use a secure integrated circuit card to supply user account information to a provider along with a request for access to features, and to subsequently decrypt encrypted digital video streams that can be provided in response to the request. As another example, a Subscriber Identity Module (SIM) card in a Global Systems for Mobile Communications (GSM) phone can be used to store a user's personal information, such as his or her phone book, device preferences, preferred network(s), saved text or voice messages and service provider information. A SIM card can allow a user, for example, to change handsets while retaining all of his or her information on the SIM card. Smart cards can be used in a variety of applications (e.g., electronic payment systems, including specialized auto-debit devices such as public transportation cards and personal identification documents, such as passports, drivers licenses, and medical identification cards).

Smart cards can be subject to attacks such as reverse engineering. In a reverse engineering attack, the goal of a hacker is to study embedded instructions (or "code") in the smart card memory in order to clone the smart card functionality on an easily available programming device. Hardware countermeasures such as memory encryption and implanted read-only memories (ROMs) are commonly implemented on secure microcontrollers to prevent such code reverse engineering. However, the smart card's central processing unit (CPU) typically has unencrypted access to the entire program memory contents and can be manipulated to output the entire contents of memory. Once sensitive information has been extracted from a device, the information can be used for various nefarious purposes. For example, a hacker can obtain pay-per-view or video-on-demand services using another user's account; the hacker can access telecommunication services that are billed to another user; the hacker can steal another user's bank account funds; the hacker can steal another's identity; etc.

SUMMARY

This specification describes method, apparatus, systems and computer program products for protecting software against reverse engineering.

In general, one aspect of the subject matter described in this specification can be embodied in a method that includes identifying a first flow control instruction in an executing program, the first instruction being associated with a first program address at which program execution will continue after execution of the first instruction. A determination is made as to whether the first program address is protected. If the first program address is protected, a first alternate program address is substituted for the first program address such that program execution will continue at the first alternate program address after execution of the first instruction.

These and other embodiments can optionally include one or more of the following features. Determining if the first program address matches a camouflage program address. The first alternate program address can be persisted in a location that is inaccessible to an execution unit. During execution of the program: 1) identifying a second flow control instruction in the program, the second instruction associated with a second program address at which program execution will continue after execution of the second instruction; 2) determining if the second program address is protected; and 3) if the second program address is protected, substituting a second alternate program address for the second program address such that program execution will continue at the second alternate program address after execution of the second instruction. The first instruction is a call instruction, a branch instruction or a jump instruction. A camouflaged returned instruction can be executed. Determining if camouflaging of the first program address is enabled. And changing the program flow of execution to the first alternate program address.

In general, another aspect of the subject matter described in this specification can be embodied in a system that includes a plurality of alternate program addresses and a plurality of camouflaged program addresses, each camouflaged program address being associated with one alternate program address. An engine is operable to: 1) during execution of a program, identify a first flow control instruction in the program, the first flow control instruction associated with a first program address at which program execution will continue after execution of the first instruction; 2) determine if the first program address is protected; and 3) if the first program address is protected, substitute a first alternate program address for the first program address such that program execution will continue at the first alternate program address after execution of the first instruction.

These and other embodiments can optionally include one or more of the following features. The first program address is protected if the first program address matches a camouflage program address. The first alternate program address can be persisted in a location that is inaccessible to an execution unit. The engine is further operable to, during execution of the program: 1) identify a second flow control instruction in the program, the second instruction associated with a second program address at which program execution will continue after execution of the second instruction; 2) determine if the second program address is protected; and 3) if the second program address is protected, substitute a second alternate program address for the second program address such that program execution will continue at the second alternate program address after execution of the second instruction. The first instruction is a call instruction, a branch instruction or a jump instruction. The engine is further operable to execute a camouflaged returned instruction. The engine is further operable to determine if camouflaging of the first program address is enabled. The engine is further operable to change the program flow of execution to the first alternate program address.

In general, another aspect of the subject matter described in this specification can be embodied in a program address camouflage unit comprising a first memory portion whose contents identify camouflaged program addresses, a second memory portion whose contents store alternate program addresses corresponding to the camouflaged program addresses, and a replacement unit that a) determines whether a fetched flow control instruction operand corresponds to the contents of the first memory portion, and if so, b) replaces an operand associated with the instruction with an address selected from the second memory portion.

These and other embodiments can optionally include one or more of the following features. A flow control instruction can be a call instruction, a branch instruction or a jump instruction. The replacement unit is further capable of determining whether replacement of the operand is enabled. The first memory portion and the second memory portion are inaccessible to an execution unit.

In general, another aspect of the subject matter described in this specification can be embodied in a system comprising: 1) an instruction fetch unit operable to fetch program instructions; 2) an instruction decode unit operable to decode the fetched program instructions; 3) a plurality of camouflage program address registers; 4) a plurality of alternate program address registers; and 5) a replacement unit operable to substitute a camouflaged program address associated with a flow control program instruction and stored in a camouflage program address register with a corresponding alternate program address stored in an alternate program address register before execution of the flow control instruction such that program execution continues at the alternate program address after execution of the flow control instruction.

Particular embodiments of the subject matter described in this specification can be implemented to realize one or more of the following advantages. Software is protected against reverse engineering. Program addresses can be camouflaged to obscure program execution flow. Likewise, instructions can be camouflaged to obscure their true function. The destination address of call, jump and branch instructions can be changed on the fly so that execution flow is capricious. Such altered code will only run properly if the hardware implementation is reverse engineered.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1A:
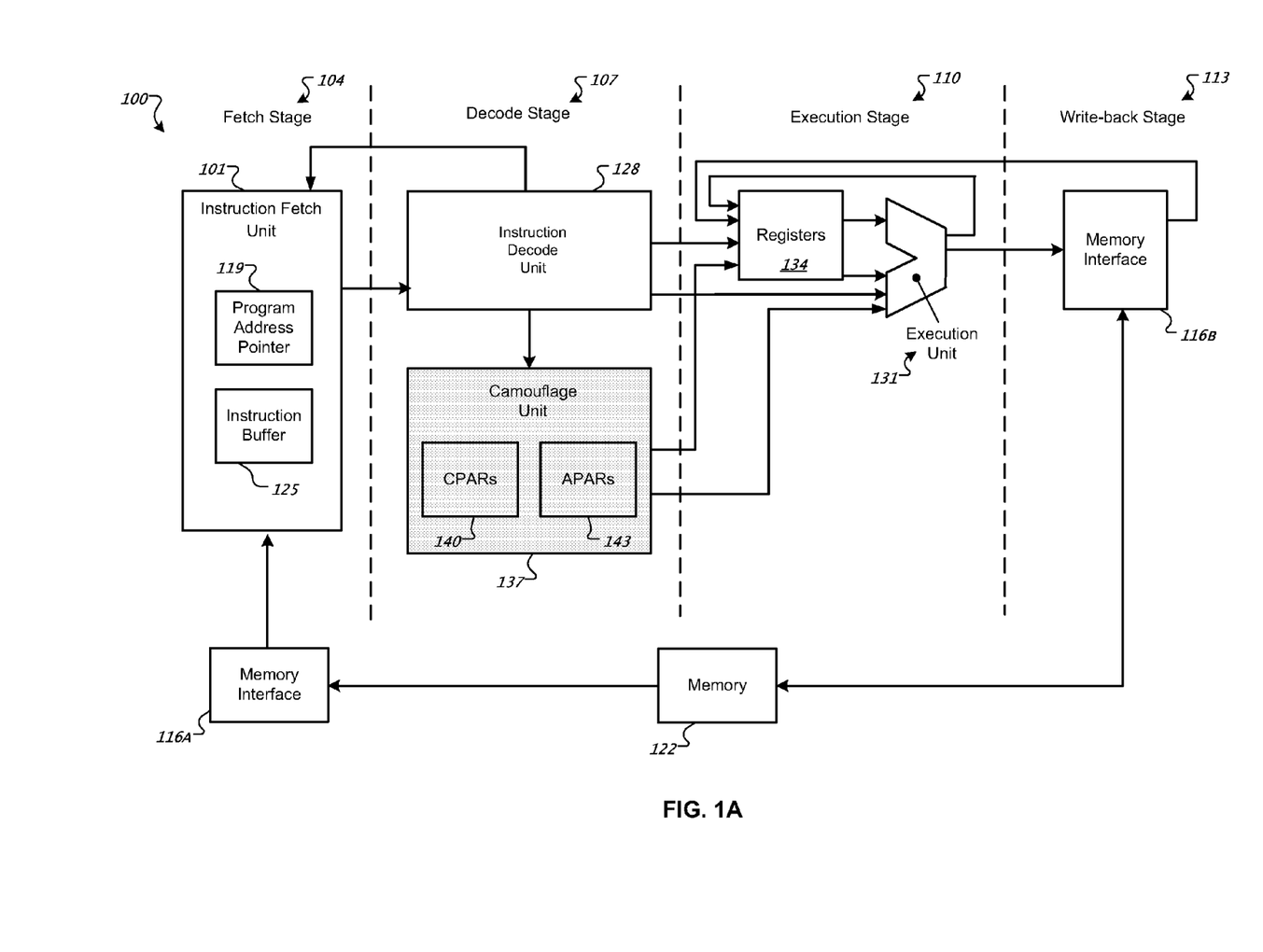
FIG. 1A is a block diagram of an example system that fetches, decodes and executes programming instructions and that includes a program address camouflage unit.

FIG. 1A is a block diagram of an exemplary system 100 that fetches, decodes and executes programming instructions.

The system 100 can function to obfuscate program flow and thereby strengthen security of operations provided by various instructions that are executed by the system 100. In particular, some implementations of the system 100 include a camouflage unit 137 or "engine" that determines whether a flow control instruction (e.g., call, jump, or branch) has a protected or "camouflaged" program address argument and, if so, replaces the address with an alternate program address during or after instruction decoding. In some implementations, each camouflaged program address has an associated alternate program address that is persisted in a part of the system 100 that is not accessible to the execution unit 131.

The system 100 in FIG. 1A processes programming instructions in four exemplary phases: instructions are fetched in an instruction fetch stage 104, decoded in an instruction decode stage 107, executed in an execution stage 110, and data can optionally be stored in memory in a write-back stage 113. Other numbers of stages are possible and not all of the stages are required (e.g., write-back is not required in some implementations).

To fetch instructions in the instruction fetch stage 104, the system 100 includes an instruction fetch unit 101 and a memory interface 116A. As shown, the instruction fetch unit 101 includes a program address pointer 119—sometimes referred to as an instruction pointer or a program counter. In some implementations, the program address pointer stores an address of an instruction to be fetched next from memory 122. At some point during the instruction fetch stage 104, the memory interface 116A fetches the next appropriate instruction, based, for example, on an address stored in the program address pointer 119.

Optionally, the instruction fetch unit 101 includes an instruction buffer 125 for storing a number of instructions. In some implementations, the instruction buffer 125 can be used to queue several instructions or to facilitate instruction reordering. In addition, the instruction buffer 125 can be used to store multiple possible instructions, such as, for example, all possible next instructions following a branch instruction.

To decode instructions in the instruction decode stage 107, the system 100 includes an instruction decode unit 128. The instruction decode unit 128 can parse each instruction into, for example, an operation code (opcode), register operands, or immediate value operands. Based on the opcode, the instruction decode unit 128 can control various aspects of the system 100, as will be described in more detail below.

To execute instructions in the execution stage 110, the system 100 includes an execution unit 131 and one or more registers 134 for storing operands and results of operations performed by the execution unit 131. In some implementations, the execution unit 131 performs mathematical operations, such as addition, subtraction or multiplication of operands; the execution unit 131 can perform logical operations, such as, AND, OR, XOR, NAND, etc.; or, the execution unit 131 can perform a bit-shifting operation. In some implementations, the execution unit 131 includes an arithmetic logic unit (ALU) or a floating point unit (FPU) to perform the above-described example operations. When executed by the execution unit 131, a flow control instruction can cause the program address pointer 119 to be replaced with the value of the flow control instruction's operand. In this way, the flow of execution of a program can be changed dynamically.

To store results of operations performed in the execution stage 110 (e.g., during the write-back stage 113) the system 100 includes a memory interface 116B. The memory interface 116B can store a result from the execution unit 131 in the memory 122. The memory interface 116B can also move data from the memory 122 to the registers 134 for some operations performed in the execution stage 110. The memory interface 116B and the memory interface 116A can be part of the same overall memory interface, or the memory interfaces 116B and 116A can be separate interfaces. Moreover, the memory 122, shown as a single memory, can in fact include separate memories. For example, in a "von Neumann architecture," a single memory space is be used for both data and instructions, whereas in a "Harvard architecture," separate memory spaces are used for data and instructions.

As shown, the system 100 also includes a camouflage unit 137 that can work in conjunction with the instruction decoder to replace the program address operand associated with flow control instructions with an alternative address. In particular, the camouflage unit 137 can replace a "camouflaged" program address (CPA) with an alternate program address (APA); in some implementations a CPA is replaced with an APA only if camouflage is enabled for the [CPA, APA] pair. Camouflaging program addresses makes code difficult to reverse engineer because program flow is not apparent from the code itself. Camouflaging also increases the coupling between the hardware and the embedded software, making the code unusable on other devices.

For example, the CPA can be the address of dummy software task where as the APA is the address of the critical software function to hide. Thus, the critical software function is never directly called and is camouflaged in the embedded software. In various implementations, a camouflaged function call return instruction (RET) can be added to the CPU instruction set to make it more difficult for hackers to identity never-directly-called software tasks (which should however finish with a RET instruction). For example, the new RET instruction could be described as an arithmetic instruction, such as addition.

Figure 1B:
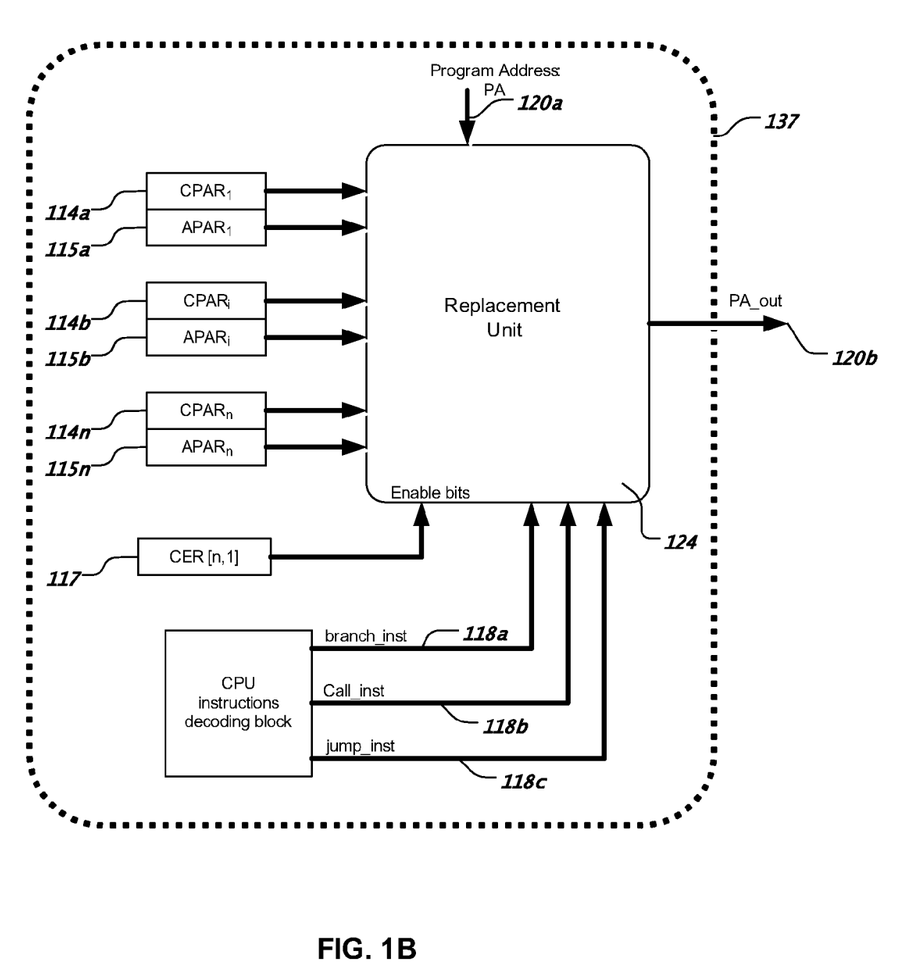
FIG. 1B is a block diagram that illustrates details of an example program address camouflage unit.

FIG. 1B is a block diagram of the camouflage unit 137 that is capable of replacing CPAs with APAs for flow control instructions. The CPAs are persisted in CPA registers (CPARs) 114a-n. Likewise, corresponding APAs are persisted in APA registers (APARs) 115a-n. There can be any number of CPARs and corresponding APARs. In various implementations, a camouflage enable register (CER) 117 enables or disables the camouflage mechanism for a given [CPA, APA] pair. That is, each pair of [CPA$_i$, APA$_i$] can have its own enable bit CER$_i$. In some implementations, to avoid fault injection attacks on the CER 117 which could disable the camouflage mechanism, the CER 117 can be omitted from the camouflage unit 137 so that camouflaging is always enabled.

For security reasons, execution unit 131 does not have read access to the CPARs 114a-n and APARs 115a-n. In some implementations, the registers 114a-n and 115a-n are loaded with CPAs and APAs by hardware during a system 100 power-on sequence. The hardware could, for instance, read values stored in a specific memory location inaccessible to the execution unit 131 and populate the CPARs 114a-n and APARs 115a-n with these values. These memory locations, or the registers themselves, could be loaded during manufacturing or customization of the system 100.

Each time a branch, call or jump instruction is detected by the decode unit 128, one of the respective output signals 118a-c is set. This causes the replacement unit 124 to examine the program address operand 120a of the instruction and compare it with one or more CPA registers (CPARs) 114a-n. If the program address operand 120a matches a CPAR value, the program address out value 120b is set to the APA in a corresponding APAR. The program address out value 120b replaces the CPA with the APA for the instruction and, when the instruction is executed by the execution unit 131, the program address pointer 119 will be set to the APA if the instruction causes a change in flow control. For example, if the program address operand 120a for a decoded branch instruction is equal to the value in register 114b, and the appropriate enable bit in the CER 117 is set for the CPA, the program address out value 120b is set to the value in register 115b.

Figure 2:
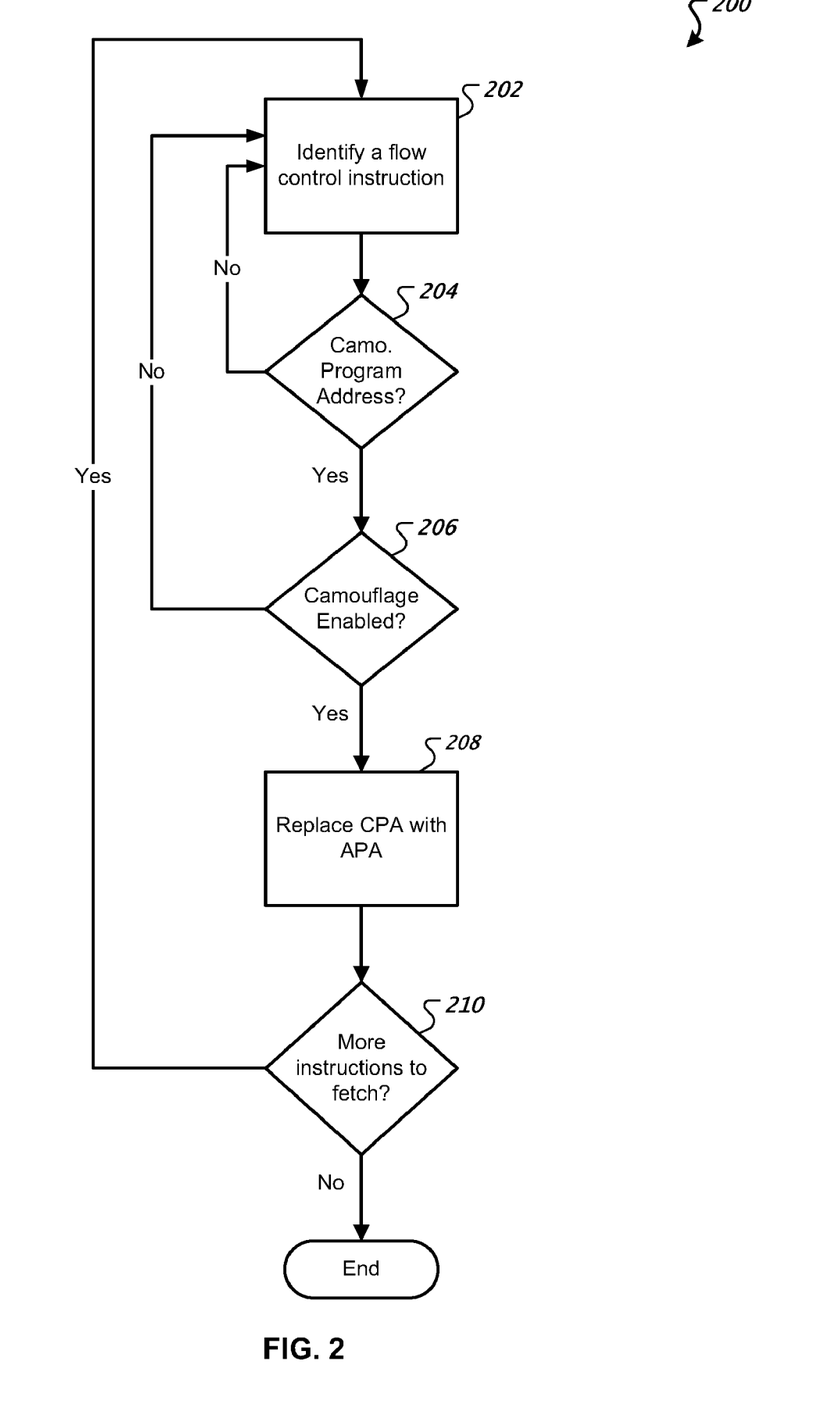
FIG. 2 is a flow diagram of an example method of replacing camouflaged program addresses with alternative program addresses.

FIG. 2 is a flow diagram of an example method 200 of replacing camouflage program addresses with alternate program addresses. The method 200 can be implemented by a device or a computer program in order to strengthen security of sensitive information stored on or processed by the device. In particular, the method 200 can be employed to replace CPAs with APAs for select instructions. As shown, the method 200 includes identification of a flow control instruction (step 202). For example, referring to FIGS. 1A-B, the instruction fetch unit 101 identifies (201) an instruction to be fetched; more particularly, the instruction fetch unit 101 identifies (201) an address of an instruction to be fetched from memory 122, based on contents of the program address pointer 119. The instruction is then fetched and decoded by, for example, decode unit 128. If the instruction is a flow control instruction, a signal is set (e.g., lines 118a-c) which initiates replacement (e.g., activates the replacement unit 124).

The method includes determining whether the flow control instruction has a program address operand equal to a CPA (e.g., stored in a CPAR) (step 204). For example, in some implementations, the camouflage unit 137 determines whether the program address operand 120a for the flow control instruction is equal to any of the CPAs stored in CPARs 114a-n. If not, the method continues at step 202. Otherwise, the method further includes determining whether camouflage is enabled for the CPA (step 206). For example, if the enable bit in CER 117 is set for the CPAR holding the value of the CPA 120a, then camouflage is enabled for the CPA. If so, the CPA is replaced with a corresponding APA (e.g., from the corresponding APAR) (step 208). If not, the method continues at step 202. If there are more instructions to fetch, the method continues at step 202 (step 210).

Figure 3A:
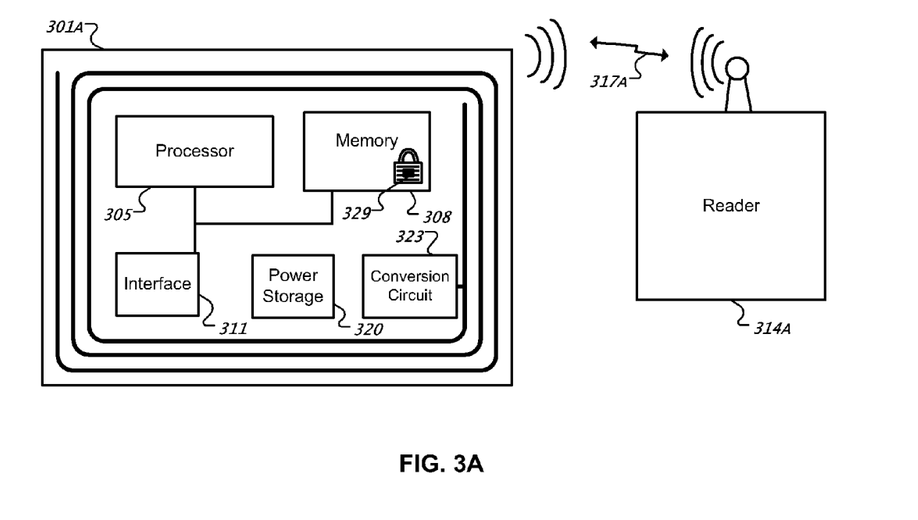
FIGS. 3A and 3B are block diagrams of example smart cards that can be used with the system.
Figure 3B:
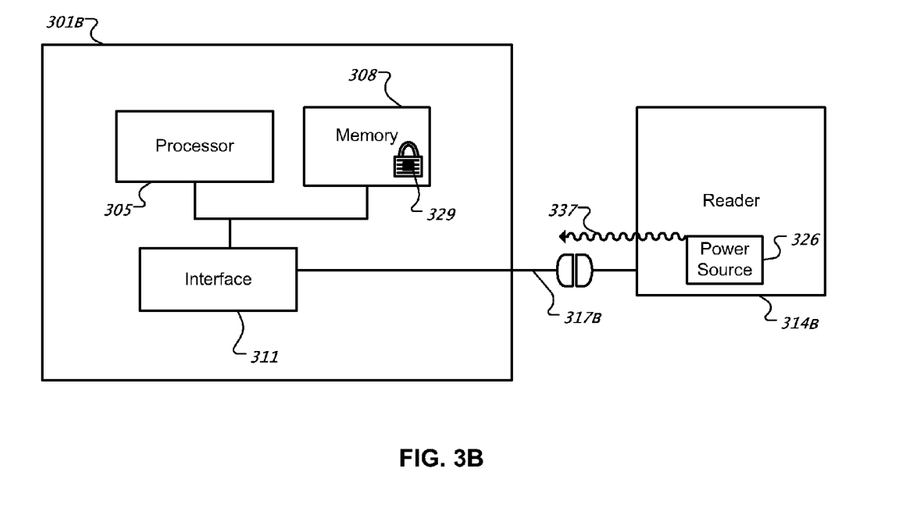

FIGS. 3A and 3B are block diagrams of example smart cards 301A and 301B that can be used to implement system 100. In each of the example smart cards 301A and 301B, protected information 329 stored in the smart cards 301A or 301B can be protected by the systems and methods described herein. As shown, each example smart card 301A or 301B includes a processor 305 (e.g., a microprocessor or microcontroller) configured to execute instructions stored in memory 308 or received using an interface 311. The memory 308 can represent multiple different kinds of memory, such as, for example, ROM or RAM, flash, DRAM, SRAM, etc. For example, in some implementations, program instructions are stored on ROM, and the processor 305 uses some form of RAM to store intermediate data as the programming instructions are executed.

The interface 311 provides a means for the smart cards 301A or 301B to interact with external systems, such as, for example, a smart card reader 314A or 314B. In some implementations, the interface 311 works in conjunction with a wireless communication channel 317A that includes, for example, RF (radio frequency) signals that are adapted for a particular communication protocol (e.g., a protocol characterized by ISO/IEC 14443 or ISO 15693 (ISO refers to the International Organization for Standardization; IEC refers to the International Electrotechnical Commission)). In some implementations, the interface 311 works in conjunction with a wired communication channel 317B that is adapted for a particular communication protocol (e.g., a protocol characterized by ISO/IEC 7816 or ISO/IEC 7810).

The smart cards 301A or 301B are powered by a power source. For example, the smart card 301A can be powered by an integrated power storage device 320, such as a battery or low-loss capacitor. As another example, the smart card 301A can be powered by an antenna and conversion circuit 323 that receives RF signals and converts energy in the RF signals to electrical energy that can be used to power the components of the smart card 301. As another example, the smart card 301B can be powered by a source that is external to the smart card itself, such as a power supply 326 that is integrated in a corresponding smart card reader 314B.

The smart cards 301A or 301B can store various protected information 329, such as, for example, information that identifies a user, a user's financial or service account, an encryption or decryption key, biometrics information, etc. In some implementations, protected information 329 is protected by an encryption or decryption algorithm that uses one or more keys that are either also stored in the memory 308, provided by the smart card reader 314A or 314B, or both.

In operation, the smart card reader 314A or 314B can request protected information 329 from the smart card 301A or 301B. In some implementations, the smart card reader 314A or 314B provides an encryption key for the smart card 301A or 301B to use in encrypting the protected information 329 before transmitting it to the reader 314A or 314B. In some implementations, the protected information 329 is already stored in encrypted form, and the smart card reader 314A or 314B provides a decryption key to decrypt the protected information 329 before providing it to the reader 314A or 314B. In some implementations, the smart card 301A or 301B performs other operations on the protected information 329. Smart cards can also include other intrusion prevention systems such as timers, cryptography processors, cryptography accelerators, etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
receiving a program stored in on-chip memory of a system, the program including a flow control instruction, the flow control instruction referencing a program address operand, the system including a first program address register and a corresponding second program address register, the first program register being pre-loaded with a camouflage program address prior to program execution, the second program register being pre-loaded with an alternate program address prior to program execution, and the camouflage program address matching the program address operand referenced by the flow control instruction;
during execution of the program, identifying the flow control instruction in the program and the referenced program address operand;
determining if the referenced program address operand is protected; and
if the referenced program address operand is protected, substituting the alternate program address for the referenced program address operand such that program execution continues at the alternate program address after execution of the flow control instruction.

2. The method of claim 1, where the determining includes:
determining if the referenced program address operand matches the camouflage program address.

3. The method of claim 1, where:
the first program address register and the second program address register are inaccessible to an execution unit of the system.

4. The method of claim 1, where:
the flow control instruction is a call instruction, a branch instruction or a jump instruction.

5. The method of claim 1, further comprising:
executing a camouflaged returned instruction.

6. The method of claim 1, where the substituting includes:
determining if camouflaging of the referenced program address operand is enabled.

7. The method of claim 1, further comprising:
continuing program execution at the alternate program address.

8. A system comprising:
memory, the memory containing a program, the program including a flow control instruction referencing a program address operand at which program execution will continue after execution of the flow control instruction;
a first plurality of program address registers, the first plurality of program address registers being pre-loaded prior to program execution with a plurality of camouflage program addresses, the plurality of camouflage program addresses including a first camouflage program address matching the referenced program address operand;
a second plurality of program address registers, the second plurality of program address registers being pre-loaded prior to program execution with a plurality of alternate program addresses, and the plurality of alternate program addresses including a first alternate program address associated with the first camouflage program address;
an engine operable to:
during execution of the program, identify the flow control instruction in the program and the referenced program address operand;
determine if the referenced program address operand is protected; and
if the referenced program address operand is protected, substitute the first alternate program address for the referenced program address operand such that program execution continues at the first alternate program address after execution of the flow control instruction.

9. The system of claim 8, where:
the referenced program address is protected if the referenced program address operand matches the first camouflage program address.

10. The system of claim 8, where:
the first and the second pluralities of program address registers are inaccessible to an execution unit of the system.

11. The system of claim 8, where:
the flow control instruction is a call instruction, a branch instruction or a jump instruction.

12. The system of claim 8, where the engine is further operable to:
execute a camouflaged returned instruction.

13. The system of claim 8, where the engine is further operable to: determine if camouflaging of the referenced program address operand is enabled.

14. The system of claim 8, where the engine is further operable to:
continuing program execution at the first alternate program address.

15. A program address camouflage unit comprising:
a first memory portion whose contents are preloaded prior to program execution and identify camouflage program addresses;
a second memory portion whose contents are preloaded prior to program execution and store alternate program addresses corresponding to the camouflage program addresses; and
a replacement unit that, during program execution, a) determines whether a fetched flow control instruction operand matches a camouflage program address identified by the contents of the first memory portion, and if so, b) replaces the fetched flow control instruction operand with an address selected from the second memory portion.

16. The program address camouflage unit of claim 15, where:
a flow control instruction is a call instruction, a branch instruction or a jump instruction.

17. The program address camouflage unit of claim 15, where the replacement unit is further capable of:
determining whether replacement of the operand is enabled.

18. The program address camouflage unit of claim 15, where
the first memory portion and the second memory portion are inaccessible to an execution unit.

19. A system comprising:
memory containing program instructions, at least one program instruction being a control flow instruction referencing a program address operand at which program execution will continue after execution of the flow control instruction;

an instruction fetch unit operable to fetch program instructions;

an instruction decode unit operable to decode the fetched program instructions;

a first plurality of program address registers, one of the first plurality of program address registers being preloaded with a camouflage program address matching the program address operand referenced by the flow control instruction;

a second plurality of program address registers, one of the second plurality of program address registers being preloaded with an alternate program address associated with the camouflage program address; and a replacement unit operable to substitute the referenced program address operand with the alternate program address during program execution such that program execution continues at the alternate program address after execution of the flow control instruction.

* * * * *

UNITED STATES PATENT AND TRADEMARK OFFICE
CERTIFICATE OF CORRECTION

PATENT NO. : 7,613,907 B2  Page 1 of 1
APPLICATION NO. : 11/558357
DATED : November 3, 2009
INVENTOR(S) : Majid Kaabouch and Eric Le Cocquen

It is certified that error appears in the above-identified patent and that said Letters Patent is hereby corrected as shown below:

Title Page, Item (56) References Cited, Other Publications
On Page 2, Line 1 replace:
 "Seure" with
 --Secure--

In Claim 13, Column 10, Lines 27-29 replace:
 "The system of claim 8, where the engine is further operable to: determine if camouflaging of
 the referenced program address operand is enabled." with
 --The system of claim 8, where the engine is further operable to:
 determine if camouflaging of the referenced program address operand is enabled.--

Signed and Sealed this

Fifth Day of January, 2010

David J. Kappos
*Director of the United States Patent and Trademark Office*